United States Patent
Brandmeier et al.

[11] Patent Number: 5,975,250
[45] Date of Patent: Nov. 2, 1999

[54] APPARATUS AND METHOD FOR DETECTING THE THICKNESS OF A BRAKE LINING

[75] Inventors: Thomas Brandmeier, Regensburg; Hans Rauner, Nittenau; Dirk Zittlau, Stoeckelsberg, all of Germany

[73] Assignee: Siemens Aktiengesellschaft, Munich, Germany

[21] Appl. No.: 08/882,166

[22] Filed: Jun. 25, 1997

[30] Foreign Application Priority Data

Jun. 25, 1996 [DE] Germany .................. 196 25 400

[51] Int. Cl.⁶ .................................................. F16D 66/00
[52] U.S. Cl. ................... 188/1.11 W; 188/1.11 E
[58] Field of Search ................ 188/1.11 W, 1.11 E, 188/1.11 L, 1.11 R; 340/453, 454

[56] References Cited

U.S. PATENT DOCUMENTS

| | | | |
|---|---|---|---|
| 3,808,593 | 4/1974 | Kopernik et al. | 340/454 |
| 3,887,040 | 6/1975 | Simon et al. | 188/1.11 R |
| 4,749,063 | 6/1988 | Garrett et al. | 188/1.11 E |
| 4,937,554 | 6/1990 | Herman | 340/453 |
| 5,207,299 | 5/1993 | Feldman | 188/79.55 |
| 5,403,072 | 4/1995 | Kilian et al. | 303/3 |
| 5,825,287 | 10/1998 | Zarybnicky, Sr. et al. | 340/453 |

FOREIGN PATENT DOCUMENTS

| | | |
|---|---|---|
| 0 310 461 A1 | 4/1989 | European Pat. Off. . |
| 0 567 155 A1 | 10/1993 | European Pat. Off. . |
| 3818877A1 | 12/1989 | Germany . |
| 4229042A1 | 3/1993 | Germany . |
| 4231107A1 | 3/1994 | Germany . |

*Primary Examiner*—Robert J. Oberleitner
*Assistant Examiner*—Melanie Talavera
*Attorney, Agent, or Firm*—Herbert L. Lerner; Laurence A. Greenberg

[57] ABSTRACT

An apparatus and a method detect the current thickness and thus the wear of a brake lining of a motor-vehicle brake system, which has a wheel-brake actuator at each wheel that actuates the wheel brake and is individually electrically controlled. The wheel-brake actuator contains a hydraulic piston which is moved by an electric motor and is provided with a sensor that detects the brake pressure or brake force as well as with a further sensor that detects the travel of the hydraulic piston. The thickness of the brake lining is determined from signals of the two sensors. To that end, a measurement is made of the travel performed by the hydraulic piston until a predetermined brake pressure is reached.

4 Claims, 2 Drawing Sheets

APPARATUS AND METHOD FOR DETECTING THE THICKNESS OF A BRAKE LINING

BACKGROUND OF THE INVENTION

Field of the Invention

The invention relates to an apparatus and a method for detecting the thickness of a brake lining.

Such an apparatus and method serve to monitor the state of the brake linings on the wheel brakes of a motor vehicle. Since the brake linings in all friction brakes are subjected to constant wear, information regarding the thickness of the linings is very important for the functioning of the brake. The brake linings can be monitored from such information to ensure that they maintain a minimum thickness which is critical for functioning and safety.

In an apparatus for monitoring a brake lining, which is known from German Published, Non-Prosecuted Patent Application DE 38 18 877 A1, a wear sensor has a plurality of electric conductors disposed at a distance from one another which are worn down with the brake lining. The number of conductors which are exposed in the process and have a short circuit to the chassis is a measure of the wear of the brake lining. Each short circuit to the chassis trips a fuse and reduces a monitoring current. German Published, Non-Prosecuted Patent Application DE 42 31 107 A1 discloses a sensor for determining the lining thickness and at the same time the temperature of brake linings. In that sensor an electric resistor which is disposed on the brake lining has a resistance value that is a function of its length and an electric resistance that has the same chassis ground is coupled thereto. Such a sensor is relatively complicated, changes to the brake linings are necessary and the resistor material must correspond to the lining material in terms of abrasion behavior and withstand the high temperatures occurring in the friction surface without showing signs of aging.

The increasing requirements currently imposed on modern brake systems of motor vehicles, such as anti-lock devices, travel-stability control systems, drive-slip control devices or traction control devices, necessitate braking intervention on selective wheels. In conventional brake systems, braking intervention on selective wheels is made possible with additional hydraulic pumps and solenoid valves. However, such brake systems are complicated and are not without problems. Braking intervention on selective wheels is achieved in a smoother and less complicated manner with brake systems in which each wheel is allocated an electrically controlled wheel-brake actuator that is integrated in the wheel-brake caliper and in which the requisite braking moment is produced with a brake motor. In a brake-actuating configuration known from German Published, Non-Prosecuted Patent Application DE 42 29 042 A1, an electric motor drives a drive piston through a reduction gear and a device for transforming the rotary motion of the electric motor into a linear motion. The pressure produced in a fluid chamber in that case acts on a brake-lining pressure piston. Such a brake system is also designated below as a "brake-by-wire" system or brake.

SUMMARY OF THE INVENTION

It is accordingly an object of the invention to provide an apparatus and a method for detecting the thickness of a brake lining, which overcome the hereinafore-mentioned disadvantages of the heretofore-known apparatuses and methods of this general type and with which the brake-lining thickness can be measured reliably and with less expense, particularly in the case of electrically controlled brakes allocated to individual wheels.

With the foregoing and other objects in view there is provided, in accordance with the invention, an apparatus for detecting a thickness of a brake lining of a motor vehicle brake system having a wheel brake at each wheel, comprising individually electrically-controlled wheel-brake actuators each having a hydraulic piston and each associated with a respective one of the wheels for actuating the wheel brake; electric motors each moving a respective one of the hydraulic pistons; first sensors each detecting a brake pressure or brake force at a respective one of the actuators; and second sensors each detecting travel of the hydraulic piston at a respective one of the actuators; the sensors supplying signals for determining a thickness of the brake lining.

In accordance with another feature of the invention, the thickness of the brake lining is determined with reference to travel performed by the hydraulic pistons until a predetermined brake pressure is reached.

In accordance with a further feature of the invention, the electric motors perform a rotary motion transformed into a linear motion of the hydraulic pistons, each of the electric motors has a sensor determining an angle of rotation of the electric motor, and the hydraulic pistons travel a distance determined from the angle of rotation sensor and from the transformation of the rotary motion into the linear motion.

In accordance with an added feature of the invention, the respectively determined thickness of the brake lining is compared with a predetermined minimum value and a warning signal is delivered if the thickness falls below the minimum value.

In accordance with an additional feature of the invention, measured values of the brake-lining thickness are stored for a predetermined period, and an average value of brake-lining wear per unit of time is calculated from the measured values.

In accordance with yet another feature of the invention, a remaining brake-lining life is determined from an average value of the brake-lining wear.

With the objects of the invention in view there is also provided a method for detecting the thickness of a brake lining of a motor-vehicle brake system having wheel brakes provided at each wheel, which comprises measuring a hydraulic pressure or a brake force as a measured value; measuring a travel performed by a hydraulic or brake piston producing a brake-actuating pressure during braking, as another measured value; and determining a thickness of the brake lining from the two measured values.

In accordance with a concomitant mode of the invention, there is provided a method which comprises determining the thickness of the brake lining with reference to the travel performed by the hydraulic or brake piston until a predetermined brake pressure is reached.

One advantage of the invention is that the measured brake-thickness values can be stored in a simple manner, and the operating period of the brake which can still be achieved can then be determined by extrapolation. An indication of when brake maintenance is necessary can be given to the driver of the motor vehicle. In addition, information regarding the wear behavior of the brake is thus available, and from that information conclusions can be drawn with regard to the technical state of the brake (for example increased wear due to sluggishness of a brake clasp, or very low wear due to hardening of the brake linings) as well as with regard to the road behavior.

Other features which are considered as characteristic for the invention are set forth in the appended claims.

Although the invention is illustrated and described herein as embodied in an apparatus and a method for detecting the thickness of a brake lining, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
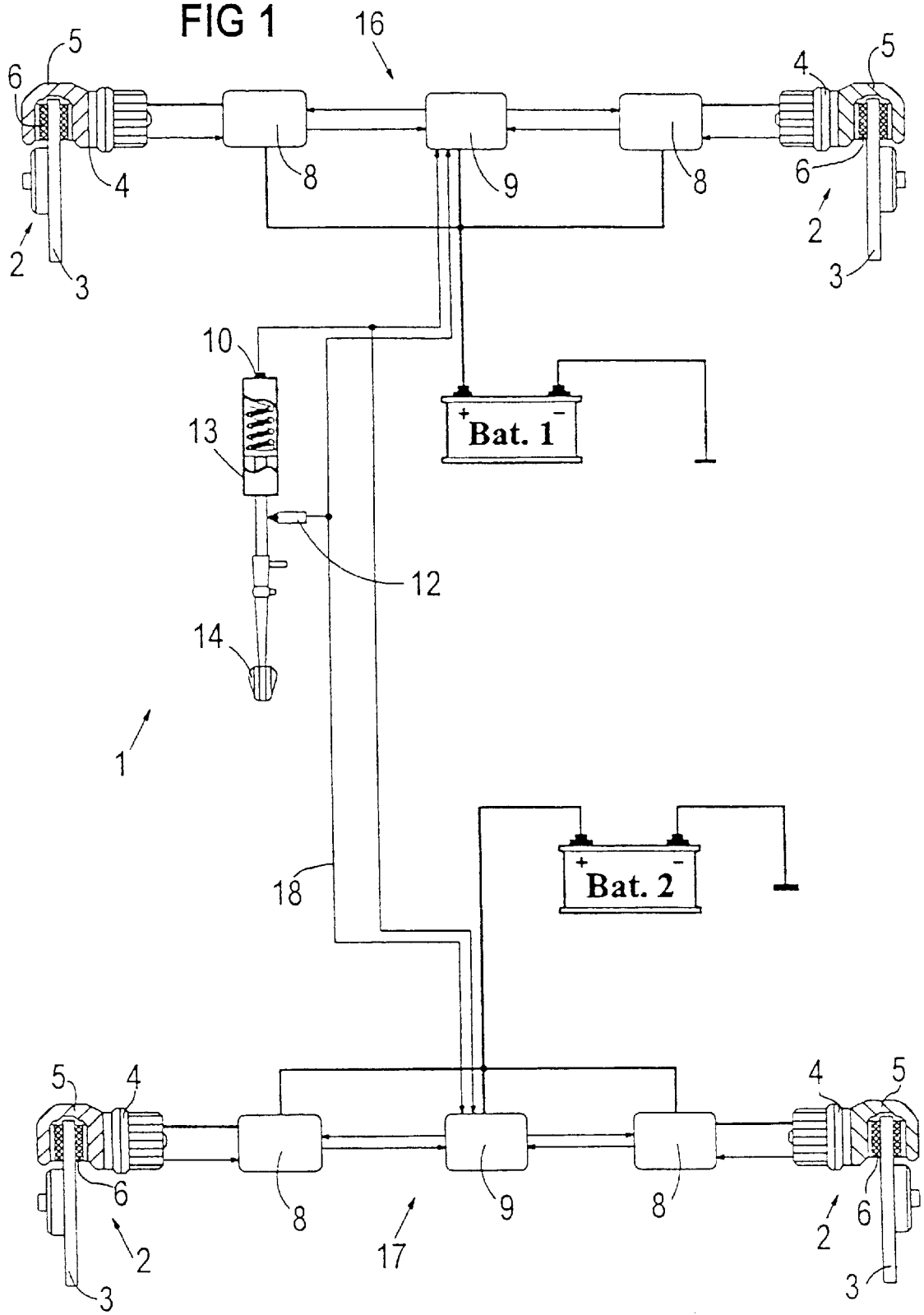
FIG. 1 is a diagrammatic, partly broken-away, top-plan view of a motor-vehicle brake system which is provided with an apparatus according to the invention for detecting brake-lining thickness.

Referring now to the figures of the drawings in detail and first, particularly, to FIG. 1 thereof, there is seen a brake system 1 for a motor vehicle having four wheels and four wheel brakes 2, each including a brake disk 3 and a wheel-brake actuator 4. The motor vehicle itself is not shown in any additional detail. The wheel-brake actuators 4 are each integrated with one associated brake caliper 5, i.e. they are combined with the latter to form a structural unit. The brake caliper 5 is constructed as a floating caliper. A braking moment is exerted on the brake disc 3 through brake linings 6 when the wheel-brake actuator 4 is actuated.

Each wheel-brake actuator 4 has an electronic power and control unit 8 which is supplied with control signals from an associated control device 9, for example for a desired moment of a wheel-brake-actuator motor. The wheel-brake-actuator motor, which is still to be described, transmits feedback variables, for example of an actual moment of the actuator motor, to the control device 9.

The wheel-brake actuator 4 likewise supplies the electronic power and control unit 8 with feedback variables, for example of a motor speed or a motor angle of rotation or of a contact pressure of the brake linings. Desired variables for each wheel-brake actuator are determined by the control device 9 from measured variables which are delivered by various sensors, for example a force sensor 10 and a displacement sensor 12 of a pedal-force simulator 13 that is actuated by a brake pedal 14 of the motor vehicle. The pedal-force simulator 13 converts a motion of the brake pedal 14, i.e. a force exerted as usual by a driver and a pedal travel, into electrical signals, which are fed to the control device 9 and represent desired values for the brakes 2, in particular for vehicle deceleration and torque or braking moment to be applied to the brake disks. In order to calculate the desired values in the event of intervention of anti-lock or travel-stability control systems, further sensor signals, for example for transverse acceleration or yaw angular velocity and rotary wheel speed, are evaluated by the control device 9.

The brake system 1 which can be seen in FIG. 1 has two brake circuits 16 and 17 that are assigned to a front axle and a rear axle. A diagonal assignment of the brake circuits, which is equally possible, differs herefrom only by the wheel-brake units being allocated differently to the control devices and power supplies. Each brake circuit 16, 17 has a separate control device 9 and a separate power supply in the form of a respective battery 1 or 2. The power supplies and the control devices may be accommodated in a housing in each case, but must then be functionally separate from one another.

Supply lines are depicted as thick lines and are not provided with arrows, whereas control lines are depicted as thin lines and are provided with arrows in accordance with a signal-flow direction.

The two control devices 9, which work independently of one another, can communicate with one another through a bidirectional signal line and can thereby recognize the failure of the other respective brake circuit 16 or 17 and if need be take suitable emergency measures. The brake system may also be supplemented by a non-illustrated third control device which monitors the two brake-circuit control devices as a supervisor.

Figure 2:
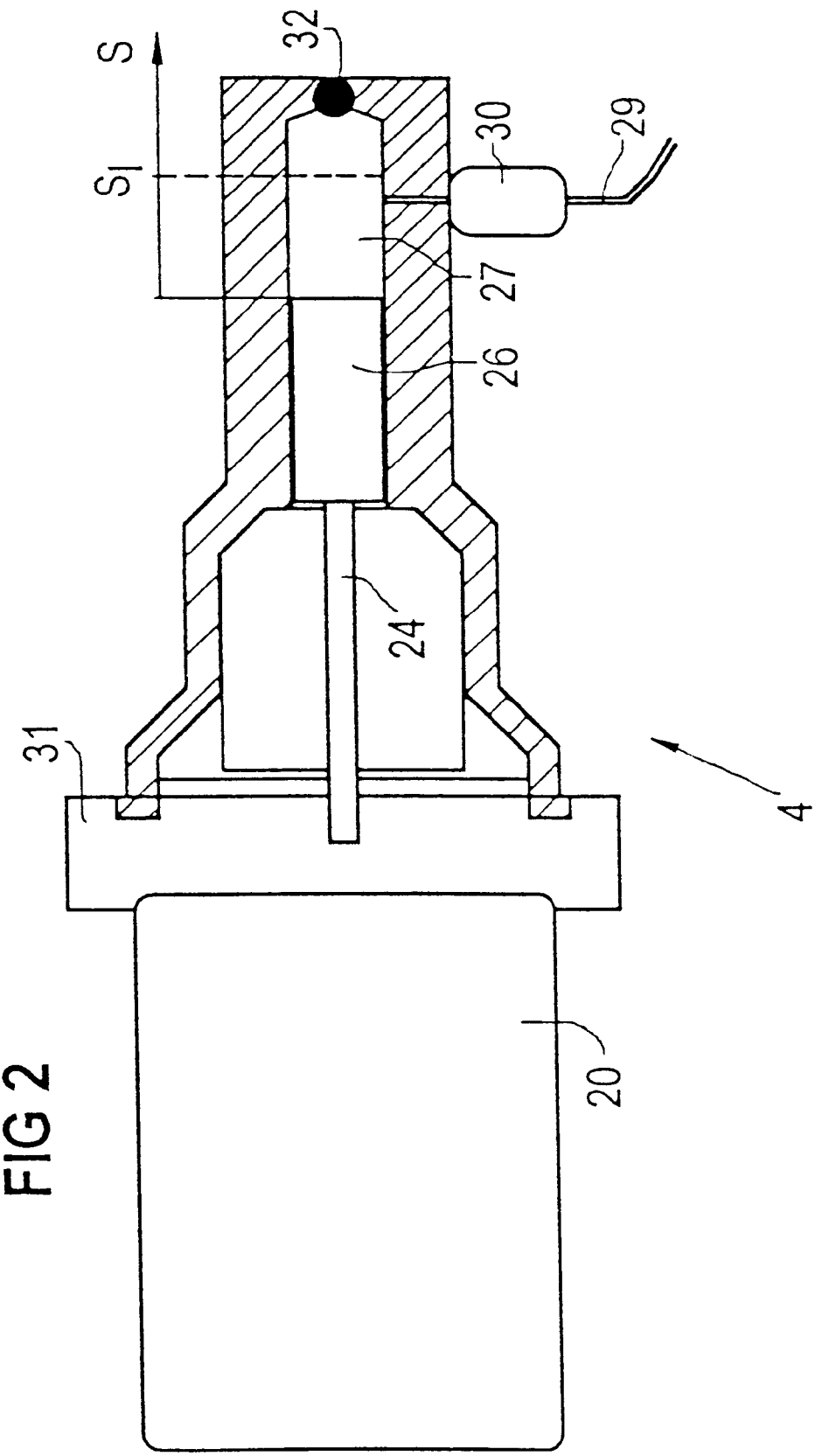
FIG. 2 is an enlarged sectional view of an electrohydraulic brake actuator used in the brake system according to FIG. 1.

As is seen in FIG. 2, the brake actuator 4 which is directly mounted on the brake caliper as has already been mentioned, is driven by an electric motor 20 that is constructed, for example, as a brushless motor or as a commutator direct-current motor. The motor is connected to a linear drive, through the use of which its rotary motion is converted into a translatory motion of a spindle 24. A rotor of the electric motor 20 forms a spindle nut of a spindle transmission, which is constructed, for example, as a planetary roller transmission, ball-screw drive, acme-thread drive or the like. Such spindle transmissions are known per se (for example a one-piece threaded nut RGTB of the firm INA Lineartechnik oHG) and are therefore not shown in any detail.

An axial force of the spindle 24 moves a hydraulic piston 26 in a cylinder 27 containing brake fluid and produces a hydraulic pressure which is transmitted through a pressure line 29 to a non-illustrated wheel brake for pressing the brake linings 6 at the wheel brake against the brake disk 3 and thus producing a braking moment on the brake disk.

In principle, the actuator unit, including a power and control unit, an electric motor and a spindle/bearing unit, can be used irrespective of the type of transformation (hydraulic or mechanical) as long as provision is made for the same transformation ratios to be present. A resulting reduction in the number of different paths reduces the manufacturing costs and the outlay for keeping the brakes in stock.

Accurate data regarding the brake-lining thickness and exhaustive information therefrom regarding an actual thickness or, equivalent thereto, a wear of the brake linings (the original brake-lining thickness minus the brake-lining thickness measured at any point in time is equal to the brake-lining wear) are determined with the apparatus according to the invention, in particular in brake-by-wire systems having electrohydraulic actuators, as is described in the prior art, from signals supplied by sensors that are present anyway in the motor vehicle, either without further sensors being necessary or with only a very small additional outlay for sensors. The apparatus is suitable not only for brake systems having electrohydraulic actuators but also for those having electromechanical actuators.

In such brake-by-wire systems, there is a first system-related sensor 30 for measuring the pressure (or the force), in order to regulate the predetermined brake pressure to be applied by the wheel-brake actuator or the corresponding brake force. In this case, it is irrelevant whether this sensor measures the pressure or the force directly or whether these variables are derived with the requisite accuracy from another existing variable (e.g. from the electric-motor current).

Apart from the brake pressure or the brake force, the displacement travel of the hydraulic piston 26, i.e. a travel indicated by reference symbol s that is performed by the latter during actuation of the brake, is detected by a second or further sensor 31. This can be carried out, for example, with the aid of the electric motor 20 as follows:

- In the case of a brushless motor, an angle of rotation a through which the motor rotates is determined by internal sensors for a non-illustrated known electronic commutation.
- In the case of a commutator direct-current motor, the angle of rotation $\alpha$ can be determined by integration of the rotary speed determined through the use of a measurement of the back e.m.f.

If the displacement travel cannot be determined with the sensors described above, the angle of rotation is measured through the use of an additional simple angle-of-rotation sensor that is also indicated by reference numeral 31. A large number of such angle-of-rotation sensors are available at low cost and they can easily be attached to the motor. Since all such simple or straightforward angle-of-rotation sensors only take relative measurements (i.e. they measure the angular range covered in each case and do not measure absolute angular positions), a limit switch 32 is also required in this case in order to deliver the position of the hydraulic piston 26 after the electronic control unit is switched on, i.e. as a rule after the ignition is switched on, as a reference signal.

The travel s can easily be calculated from the angle of rotation $\alpha$ and a transformation p of the rotary motion into the linear motion: $s = p*\alpha/2\pi$. In this case, the accuracy of the angle of rotation is of secondary importance due to the transformation of the rotary motion of the electric motor 20 into the linear motion of the spindle 24 (in a typical configuration, an angle of rotation of 6 degrees corresponds to a linear travel of 15 $\mu$m). In general, an angle-of-rotation measurement (or a rotary-speed measurement, which is integrated to an angle) is relatively simple and inexpensive to effect. In the brake system according to the invention, the displacement signal is used not only to determine the brake-lining wear but also as a redundant sensor signal for the pressure or force measurement, in order to achieve the high margin of safety required for a brake system. Therefore, the displacement measurement for determining the brake-lining wear does not entail any additional costs.

The brake-lining wear is determined as described below from the two sensor signals regarding piston travel and pressure.

With increasing brake-lining wear, the position of the hydraulic piston 26 at which a predetermined pressure (e.g. pressure=5 bar) is reached when the brake is actuated is displaced further forward, that is to the right in FIG. 2. This displacement is a direct measure of the thickness of the brake lining 6 that is still remaining and thus of the brake-lining wear. However, this "pressure point" depends on the original thickness of the respective brake lining and on the stiffness of the brake system. Although the compressibility decreases together with the thickness of the brake linings, this effect is negligible at a low pressure point. A resolution of about 100 $\mu$m is therefore readily obtained for the determination of the brake-lining thickness.

If the wear is plotted over a predetermined time, an average value of the brake-lining wear per unit of time can be calculated therefrom or, by including the distance covered, a wear rate per distance can be determined. Once the brake-lining thickness is known, the operating time remaining, or the distance remaining, for the brake linings can also be determined therefrom. In addition, the following evaluations can be carried out:

Indication of the minimum lining thickness.

Indication of the wear rate.

Monitoring for technical defects (for example in the event of unusually high or low wear, or in the event of uneven wear on different wheels).

Indication of the time or distance remaining until brake maintenance.

Detection of leakages in partially hydraulic systems.

The minimum lining thickness is recognized due to the fact that the respectively determined thickness of the brake lining is compared with a predetermined minimum value and a warning signal is delivered if the thickness falls below this minimum value. The minimum value is reached when the hydraulic piston 26 reaches the predetermined pressure at a travel point s1.

The apparatus and the method described above have the following advantages:

No additional sensors, or only a few additional sensors, are required.

The possible additional sensors (limit switch, angle-of-rotation sensor) are inexpensive, relatively accurate, insensitive to environmental influences and easy to attach.

No structural change to the brake linings 6 is necessary.

The sensors that are used do not wear out (in contrast to the above-mentioned known wear-measuring devices).

The additional sensors help to increase the operational reliability of the wheel-brake actuator 4.

We claim:

1. In a motor vehicle including wheels and a brake system having a wheel brake with a brake lining at each wheel, an apparatus for detecting a thickness of the brake linings, comprising:

individually electrically-controlled wheel-brake actuators each having a hydraulic piston and each associated with a respective one of the wheels for actuating the wheel brake;

electric motors each performing a rotary motion transformed into a linear motion of said hydraulic pistons, each of said electric motors having a sensor determining an angle of rotation of said electric motor, and said hydraulic pistons travelling a distance determined from said angle of rotation sensor and from the transformation of the rotary motion into the linear motion;

first sensors each detecting a brake pressure or brake force at a respective one of said actuators; and second sensors each detecting travel of said hydraulic piston at a respective one of said actuators;

said sensors supplying signals for determining a thickness of the brake lining, the thickness of the brake lining determined with reference to travel performed by said hydraulic pistons until reaching a predetermined brake pressure.

2. The apparatus according to claim 1, wherein the respectively determined thickness of the brake lining is compared with a predetermined minimum value and a warning signal is delivered if the thickness falls below the minimum value.

3. The apparatus according to claim 1, wherein measured values of the brake-lining thickness are stored for a predetermined period, and an average value of brake-lining wear per unit of time is calculated from the measured values.

4. The apparatus according to claim 3, wherein a remaining brake-lining life is determined from an average value of the brake-lining wear.

* * * * *